April 23, 1957  J. KOWASKI  2,789,579
FLUID TANK VALVE
Filed March 18, 1954
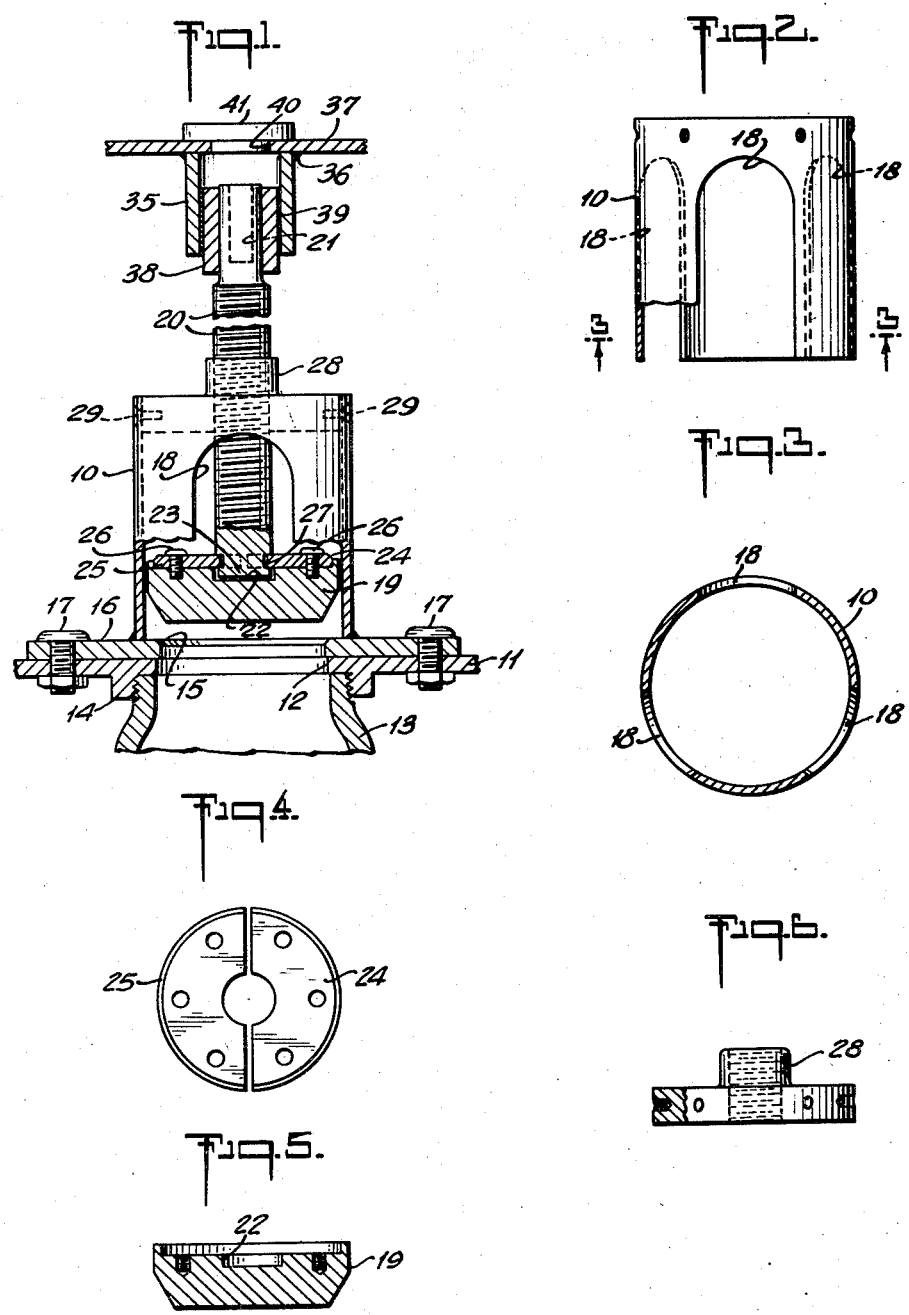
INVENTOR
JOSEPH KOWASKI
BY
ATTORNEY

United States Patent Office 2,789,579
Patented Apr. 23, 1957

2,789,579

FLUID TANK VALVE

Joseph Kowaski, Kenvil, N. J.

Application March 18, 1954, Serial No. 417,073

1 Claim. (Cl. 137—605)

This invention relates to valves for fluid tanks such as are used for transporting and storage of fluids and the like and provides a valve of novel structural features, which will assure effective seating of the valve to close the opening in the tank, and unseating of the valve when desired, without contamination of the fluid controlled.

The invention provides a valve having a head member movable vertically relative to the valve seat without rotation notwithstanding rotation of the valve stem in actuation of the valve. By this arrangement, the valve head may be seated on and moved from its seat in a straight up and down movement rather than in a rotary movement, precluding grinding of the valve head on the seat, with resultant contamination and incomplete seating. The invention is further designed to provide a tank valve adapted to be readily and effectively secured to tanks of various types as initial or added equipment.

The valve of this invention is of such construction as to be inherently clean and stable and durable in use.

In the drawings:

Fig. 1 is a partly fragmentary, partly sectional view of a valve embodying the invention, Fig. 2 is a side elevational view of a casing member which may be conveniently used in carrying out of the invention, Fig. 3 is a horizontal sectional view thereof, taken of line 3—3 of Fig. 2, Fig. 4 is a top plan view of one form of means for non-rotatably connecting the valve head to the shouldered lower end of the valve stem, Fig. 5 is a vertical transverse sectional view of the valve head, and Fig. 6 is an elevational, partly fragmentary, partly sectional view of a form of internally threaded member which may be secured to the top of the casing pursuant to the invention.

The drawings illustrate a convenient form of apparatus for carrying out the invention. It will be understood that other forms may be used within the spirit and scope of and are covered by the invention.

As shown in the drawings, the tank valve of this invention is adapted to be used for control of the discharge opening 12 in the bottom 11 of a tank having a top wall 37. The valve comprises a casing 10 which may be secured to the bottom 11 of the tank in line with discharge opening 12 thereof, with which a flexible hose 13 or the like may be connected for discharge of the contents of the tank. Opening 12 may normally be closed by a cap or other closure member secured to the internally threaded ring 14 or the like or by other means suited to the same end. The valve seat 15 may be formed in registry with said opening by any suitable means, such as, for example, by providing a plate 16 having seat 15 formed thereon, said plate being secured to the bottom of the tank by bolt means 17 of the like. The casing 10 is preferably provided with a plurality of openings 18 therethrough, through which the contents of the interior of the tank may freely flow, passing thence through the discharge opening 12 except when the discharge opening is closed by the valve.

The valve head 19 is connected to the lower end of the valve stem 20 by means such that, upon rotation of the valve stem (as by inserting a suitable tool in a recess socket 21 at the upper end of the valve stem, or by other suitable means), the valve head 19 may be moved in a straight line onto the valve seat 15. A form of structure suited to that end and shown in the drawings comprises the valve head 19 having at the upper end thereof, a recess 22 so proportioned as to freely receive the shouldered lower end 23 of valve stem 20, said shouldered end being defined by recess 27. Means are provided for connecting the valve head 19 to the shouldered end 23 of the valve stem comprising semi-circular plates 24, 25, inset into the top face of said head closely circumscribed by an upstanding peripheral flange thereof, and secured thereto by any suitable means such as the screws 26. The plates have cooperating semi-circular edge portions acting as tongues received within the recess 27 defining the shouldered lower end of the valve stem, the parts being so proportioned that the plates will be received within the recess 27 without binding. The valve stem 20 is externally threaded for engagement with the internally threaded ring member 28 secured to the casing 10 as at 29. A guide sleeve 35 is fixed as at 36 to the upper wall 37 of the tank, in registry with ring 28. A spacer member 38 is secured to or formed unitary with the upper end of valve stem 20, and suitable packing or sealing means 39 are interposed between the same and the sleeve 35, guiding the valve in its vertical movement, the flexible sealing means 39 precluding excess strain on the parts. The upper end of the tank is provided with an opening 40 with which sleeve 35 is registered; a key or tool for the valve may be inserted through said opening 40 and said opening may be normally closed by a cap 41 or the like.

Having thus described my invention, what I claim as new and desire to secure by Letters Patent is:

A valve structure for controlling the flow of fluid through a discharge opening in the bottom wall of a tank which includes also a top wall; comprising a plate secured to the inner face of said bottom wall and being provided with a circular opening axially aligned with said discharge opening, said plate being provided with a bevelled valve seat surrounding the opening therein, a cylindrical casing disposed within the tank in coaxial relation to said openings and having its lower end secured to said plate, a ring member secured within the upper end of said casing and being provided with a tapped opening, said casing being provided with circumferentially spaced openings between said plate and said ring for flow of fluid from the tank into the casing, a valve stem including a threaded portion adjustably supported within said tapped opening, the lower end of said valve stem being provided with a circumferential recess, a valve head disposed within said casing having a marginal surface conforming with said valve seat and being engageable therewith, said valve head having a circular recess in the upper face thereof and an upstanding peripheral flange, the lower end of said valve stem being rotatably disposed in said recess, a pair of cooperating semi-circular plates secured on the upper face of said valve head, closely circumscribed by said flange and having inner semi-circular edge portions disposed within the recess in said valve stem for retaining same against axial movement while providing for rotary movement thereof relative to said valve head, and means supported by said top wall of the tank for guiding the upper end of said valve stem.

References Cited in the file of this patent

UNITED STATES PATENTS

| | | |
|---|---|---|
| 1,326,430 | Walsh | Dec. 30, 1919 |
| 1,556,270 | Welle | Oct. 6, 1925 |
| 1,706,445 | Forney | Mar. 26, 1929 |
| 1,894,655 | Auchincloss | Jan. 17, 1933 |
| 2,004,860 | Ferrari | June 11, 1935 |
| 2,539,932 | Schmitz | Jan. 30, 1951 |